United States Patent [19]

Hwo

[11] Patent Number: 5,585,411
[45] Date of Patent: Dec. 17, 1996

[54] PLASTIC FOAMS MADE FROM POLYBUTYLENE BLENDS

[75] Inventor: Charles C. Hwo, Sugar Land, Tex.

[73] Assignee: Shell Oil Company, Houston, Tex.

[21] Appl. No.: 563,314

[22] Filed: Nov. 22, 1995

Related U.S. Application Data

[63] Continuation-in-part of Ser. No. 342,394, Nov. 18, 1994, abandoned, which is a continuation-in-part of Ser. No. 105,694, Aug. 11, 1993, abandoned.

[51] Int. Cl.$^6$ ...................................................... C08J 9/14
[52] U.S. Cl. ............................. 521/98; 521/139; 521/140
[58] Field of Search ..................................... 521/139, 140, 521/98

[56] References Cited

U.S. PATENT DOCUMENTS

| | | | |
|---|---|---|---|
| 4,251,584 | 2/1981 | van Engelen et al. | 525/227 |
| 4,315,960 | 2/1982 | Ohji et al. | 427/248.1 |
| 4,376,184 | 3/1983 | Itoh et al. | 524/492 |
| 4,456,705 | 6/1984 | McCarthy | 521/83 |
| 4,677,133 | 6/1987 | Leicht | 521/139 |
| 4,739,547 | 4/1988 | Tanaka et al. | 29/541 |
| 4,764,535 | 8/1988 | Leicht | 521/139 |
| 4,868,044 | 9/1989 | Tanaka et al. | 428/304.4 |
| 4,918,111 | 4/1990 | Tanaka et al. | 521/89 |
| 5,180,775 | 1/1993 | Bagrodia et al. | 525/64 |
| 5,191,024 | 3/1993 | Jhibata et al. | 525/98 |

*Primary Examiner*—Morton Foelak
*Attorney, Agent, or Firm*—James Okorafor; Y. Grace Tsang

[57] ABSTRACT

It is disclosed a plastic foam product having and exhibiting excellent temperature resistance, tear resistance, and flexibility properties produced from a blend comprising poly-1-butene, styrenic block copolymer, and/or an olefinic rubber, and optionally a non-elastomeric polyolefin. These foams are particularly useful in very high temperature applications such as pipe wrap in refrigerators and HVAC.

15 Claims, No Drawings

PLASTIC FOAMS MADE FROM POLYBUTYLENE BLENDS

This is a continuation-in-part of application Ser. No. 08/342,394 filed Nov. 18, 1994, now abandoned, which is a continuation-in-part of application Ser. No. 08/105,694, filed Aug. 11, 1993 now abandoned.

FIELD OF THE INVENTION

This invention generally relates to plastic foams. More specifically, the invention relates to a plastic foam made from a blend comprising poly-1-butene(polybutylene), styrenic block or star copolymer, and/or an olefinic rubber, optionally a non-elastomeric polyolefin.

BACKGROUND OF THE INVENTION

Plastic foams, sometimes also referred to as foamed plastics are known in the art. Plastic foams are typically described in terms of various properties inclusive of density, consistency, i.e. whether flexible or rigid, cellular formation ranging from open to closed, and their electrical, thermal, mechanical and chemical properties. Methods for making plastic foams are likewise known in the art and are exemplified by (1) adding gas to the plastic mass during processing, (2) producing gas in the plastic mass during processing, and (3) forming a plastic mass from granules, to obtain a cellular structure.

Plastic foam products are used for numerous applications and fields such as automobiles, household appliances, packaging, clothing, food, and medical products. These uses are property dependent.

Properties generally required of foam products include light weight, thermal insulating, and cushioning properties. However, with the increasing uses of plastic foam products in new applications, additional properties such as more flexibility and excellent heat resistance are also important. In order to obtain the desired properties, a variety of resins are used in the manufacture of foam products. These resins include low density polyethylene, polystyrene, polypropylene, and poly-1-butene. While these resins have some of the desired properties, they also have certain limitations. For example, low density polyethylene and polystyrene cannot be used at temperatures above 100° C., and polypropylene or poly-1-butene used alone can hardly give a uniform foam with adequate flexibility. In view of these limitations, the need continues to exist to discover resins and/or resin blends which have the desired properties which enables plastic foams made therefrom to be useful in certain applications.

SUMMARY OF THE INVENTION

It is an object of this invention to provide a plastic foam product with excellent overall properties.

It is a particular object of this invention to provide a plastic foam product having good temperature resistance, good tear resistance, and good flexibility properties.

Accordingly, it is now provided a plastic foam product having excellent temperature resistance, tear resistance, and flexibility properties produced from a blend comprising poly-1-butene, styrenic block or star copolymer, and/or an olefinic rubber, a sufficient amount of at least one foaming agent, and optionally a non-elastomeric polyolefin polymer such as low density polyethylene homopolymer. These foams are particularly useful in very high temperature applications such as pipe wrap in refrigerators and HVAC.

DETAILED DESCRIPTION OF THE INVENTION

Generally speaking, the materials useful in the practice of this invention include poly-1-butene(polybutylene) styrenic block copolymer, olefinic rubber, non-elastomeric polyolefin, foaming agent, colorant, slip additives, stabilizers, blending equipment and conventional foaming equipment.

The useful poly-1-butene homo or copolymer can be isotactic, elastomeric, syndiotactic, or it can have any Characteristic that is known or expected of poly-1-butene. The poly-1-butene polymers have a melt flow in the range of from about 0.1 to 1500, with a preferred range of from about 0.5 to 200, and a particularly preferred range of from 1 to 20 g/10 min. The poly-1-butene copolymer has a melt flow in the range of from about 0.1 to 40, with a preferred range of from about 0.4 to 20, and a particularly preferred range of from about 2 to 10 g/10 min wherein said melt flows are measured by using the procedure of ASTM D1238 Condition E at 190° C. These poly-1-butene polymers including their methods of preparation, and their properties are known in the art. An exemplary reference containing additional information on polybutylene is U.S. Pat. No. 4,960,820 which is herein incorporated by reference.

The styrenic block copolymers are members of a class of block or star copolymers comprised of 1) homopolymers or copolymers of conjugated dienes, or copolymers of one or more conjugated dienes, and 2) one or more monoalkenyl aromatic hydrocarbons. These block copolymers are manufactured and sold by Shell Chemical Company as KRATON® thermoplastic polymers. A more detailed description of these types of polymers can be found, for example, in U.S. Pat. No. 3,935,338; particularly from col. 2, line 52 to col. 3, line 24. The disclosure of this patent is herein incorporated by reference.

Particularly preferred among the block copolymers are the styrenic block copolymers commonly referred to as SBS (styrene-butadiene-styrene), SIS (styrene-isoprene-styrene), SEBS (styrene-ethylene-butylene-styrene or hydrogenated styrene-butadiene-styrene block copolymer), SEPS (styrene-ethylene-propylene-styrene or hydrogenated styrene-isoprene-styrene block copolymer) which are more clearly disclosed in U.S. Pat. No. 5,149,741. Most particularly preferred are the SEBS copolymers.

Particularly preferred star copolymers are styrenic star polymers such as (styrene-butadiene)$_n$X, (styrene-butadiene-isoprene)$_n$X, (styrene-butadiene)$_n$X, or the like, wherein n=2–20, and X is a suitable coupling agent such as divinyl benzene, etc.

The term "olefinic rubber" used herein means copolymers, terpolymers and interpolymers two or more alpha olefins and/or dienes. Non-limiting illustrative examples of suitable olefinic rubbers include ethylene-propylene rubber (EPR), ethylene-propylene butadiene terpolymer (EPDM), polybutadiene, propylene-butylene binary copolymer, etc. The ethylene content of the olefinic rubber is less than 80 wt %. The weight ratio of ethylene and propylene of ethylene-propylene rubber (EPR) is 79:21 to 21:79, preferably 75:25 to 40:60, or more preferably 70:30 to 50:50. Such polymers can be prepared by various methods, for example, by copolymerizing or terpolymerizing ethylene, propylene, and other higher alpha-olefins and dienes and non-conjugated dienes in a liquid hydrocarbon or halohydrocarbon in the presence of a mixed catalyst of an organometallic compounds, such as ethylaluminum dichloride, and a transition metal compound, such as vanadium oxytrichloride. The non-conjugated dienes in this case include dicyclopentadiene, methyltetrahydroindene, methylenenorbornene, ethylidenenorbornene, 1,4-hexadiene, 1,3-cyclooctadiene, 1,4-pentadiene, 1,5-hexadiene, 1,7-octadiene and the like. The catalyst for the copolymerization can be prepared by mixing a vanadium compound, such as halides, oxyhalides, acetylacetonates or esters of vanadium metal, for example, vanadium tetrachloride, vanadium oxytrichloride, vanadyl acetylacetonate, vanadium triacetylacetonate, vandyl trialkoxides, halogenated vanadyl alkoxides, with an organoaluminum compound, for example, triethylaluminum, triisobutylaluminum, trihexylaluminum, ethylaluminum dichloride diethylaluminum monochloride, ethylaluminum sesquichloride, diisobutylaluminum monochloride, isobutylaluminum dichloride, isobutylaluminum sesquichloride or the like, or a mixture thereof. As the polymerization solvents, there may be used any inert organic solvent, for instance, an aliphatic hydrocarbon, such as propane, butane, pentane, hexane, etc.; an aromatic hydrocarbon, such as benzene, xylene, toluene, etc.; alicyclic hydrocarbon, such as cyclohexane, etc.; or a halogenated hydrocarbon, such as tetrachloroethylene, trichloroethylene, monochlorobenzene, etc., or a mixture thereof.

Commercially available olefinic rubbers, particularly ethylene-propylene butadiene terpolymer (EPDM) are excellent in thermal resistance, aging resistance, weather resistance and ozone resistance, have good electric properties and good cold brittleness, and are similar to natural rubber particularly in behavior of elastic properties on temperatures. Certain olefinic rubbers are commercially available under the name Vistalon® ethylene-propylene rubbers from Exxon Chemical Company.

The non-elastomeric polyolefins used herein are homo or copolymers of olefins with two or more carbon atoms, such as polyethylene, polypropylene, polybutylene, etc. The non-elastomeric polyolefins can be isotactic, syndiotactic, or it can have any characteristic that is known or expected of non-elastomeric polyolefins. The polyolefin used herein is preferably a polyethylene homo or copolymer, more preferably a polyethylene homopolymer, still more preferably a low density polyethylene homopolymer.

Examples of the foaming agent sometimes referred to in the literature as blowing agent, used in this invention include evaporatable (or physical) foaming agents, for example, fluorinated aliphatic hydrocarbons such as trichloromonofluoromethane and dichlorotetrafluoroethane, and aliphatic hydrocarbons such as propane, methyl chloride, isobutane, pentane and hexane; and decomposable (or chemical) foaming agents such as sodium bicarbonate, ammonium carbonate, azodicarbon amide, barium azodicarboxylate, N,N'-dinitrosopentamethylenetramine, 4,4-oxybis(benzenesulfonyl hydrazide), diphenylsulfone-3,3-disulfonyl hydrazide, p-toluene-sulfonyl semicarbazide, trihydrazinotriazine and biurea. These foaming agents in sufficient amounts can be used singly or in combination in the present invention. Among these foaming agents, it is preferable to use singly or conjointly fluorinated aliphatic hydrocarbons such as dichlorotetrafluoroethane which is chemically stable and has a great evaporation latent heat, and azodicarbonamide and sodium bicarbonate in which an amount of gas generated is large and a temperature of terminating formation of a gas is much lower than a heat deterioration starting temperature of the polymeric blend.

One or more additives may be added to the blend comprising poly-1-butene, styrenic block copolymer, and/or olefinic rubber, optionally non-elastomeric polyolefin, and at least one blowing agent. It is contemplated that the additive can be a filler, a colorant a mold release agent, U.V. stabilizers, thermal stabilizer, slip agent, antiblock agent, nucleating agent, pigment, antioxidants, flame retardants or combination therein. The additive(s) can be added in an amount of up to between about 0.1 to about 5% by weight, based on the total weight of the composition. The additive may be added to one or more of the principal components prior to blending those components. Alternatively, the additive may be added to the blend during the actual blending of the principal components. Additionally, additive may be added to the formulation after blending of the principal components has occurred.

The components in the novel blend can be combined in amounts of 1) from about 65 wt % to about 90 wt %, preferably from about 70 wt % to about 80 wt %, of poly-1-butene; 2) from about 0 wt % to about 35 wt %, preferably from about 10 wt % to about 25 wt %, more preferably from about 15 wt % to about 20 wt %, of a styrenic block or star copolymer; 3) from about 0 wt % to about 30 wt %, preferably from about 5 to about 15 wt %, more preferably from about 7 to about 12 wt %, of olefinic rubber; and 4) from about 0 wt % to about 15 wt %, preferably from about 2 wt % to about 15 wt %, more preferably from about 5 wt % to about 10 wt %, of polyolefin. Optionally, from 0.1 to 5% by weight, based on total weight of the composition, an additive or combination of additives such as those listed in the preceding paragraph above can be added to the blend.

As a specific embodiment of the present invention, the blend comprises from about 65 wt % to about 90 wt % of poly-1-butene, from about 10 to about 35 wt % of olefinic rubber, and 0% of styrenic block or star copolymer. As another specific embodiment of the present invention, the blend comprises from about 65 wt % to about 90 wt % of poly-1-butene, from about 10 to about 35 wt % of styrenic block or star copolymer, and 0% of olefinic rubber.

As a preferred embodiment of the present invention, the blend comprises from about 65 wt % to about 90 wt % of poly-1-butene, from about 5 to about 35 wt % of styrenic block or star copolymer, from about 5 wt % to about 30 wt % of olefinic rubber. As still another preferred embodiment of the present invention, the blend comprises from about 65 wt % to about 90 wt % of poly-1-butene, from about 5 to about 35 wt % of styrenic block or star copolymer, and from about 5 wt % to about 30 wt % of olefinic rubber, and from about 2 wt % to about 15 wt % of non-elastomeric polyolefin. One specific blend is prepared with about 73% by weight of poly-1-butene, 18 wt % styrenic block copolymer, and 9 wt % olefinic rubber.

Blending of the components of the inventive formulation can occur by one of several methods such as by, tumble blending, masterbatch, or melt compounding techniques. The method of combining the ingredients of the formulation is not material except as to the ultimate commercialization of the product. For example, in some cases, it is desirable to use the least amount of energy to merge the components into an effective blend. After blending, the blend is then used to make plastic foams by employing conventional equipments and techniques.

The invention is further illustrated by the following non-limiting examples and tables.

EXAMPLE 1

Formulations 2 through 6 were prepared by dry tumbling for at least 15 minutes using a concrete mixer. Thereafter, the blends were charged to a hopper and fed through an extruder and plasticated. A set of typical extrusion conditions is listed in Table 1.

TABLE 1

Foam Extrusion Conditions

Extruder Barrel Temperatures (F.):
| Zone 1 | 2 | 3 | 4 | 5 | 6 | 7 (Melt Blend) |
|---|---|---|---|---|---|---|
| 318 | 330 | 340 | 300 | 300 | 250 | 236 |

Heat Exchange Zones (°F.):
| Exchanger Oil | Exchanger In | Exchanger Out |
|---|---|---|
| 200 | 230 | 220 |

Breaker Plate (°F.): 305, Die Head (°F.): 300
Pressures (psi):

| Barrel Feed | Injector Ring | Breaker Plate | | Flange at Die Head |
|---|---|---|---|---|
| | | In | Out | |
| 2820 | 1700 | 3920 | 3280 | 1770 |

Extruder R.P.M.: 60

TABLE 2

Foam Property Rating

| Formulation | Bending Ability | Tear Strength | Stiffness |
|---|---|---|---|
| 1. PB-Control | 1 | 1 | 8 |
| 2. PB + EBA | 2 | 1 | 10 |
| 3. PB + SEBS | 10 | 8 | 2 |
| 4. PB + SEBS + EPR* | 8 | 6 | 5 |
| 5. PB + EPR* | 7 | 4 | 6 |
| 6. PB + EBA + EPR* | 6 | 4 | 7 |

*EPR is ethylene-propylene rubber
Note:
All formulations contain at least one foaming agent
Formulations:
1. 100% Polybutylene (Shell PB 0200)
2. 73% PB 0200 + 25% Ethylene Butyl Acrylate (EBA)
3. 73% PB 0200 + 27% Shell KRATONG 1657 (Styrene-Ethylene-Butylene Block Copolymer, SEBS)
4. 73% PB 0200 + 18% SEBS + 9% EP Rubber (Exxon EPR719)
5. 73% PB 0200 + 27% EP Rubber (Ethylene-Propylene Block Copolymer)
6. 72% PB 0200 + 25% EP Rubber + 8% EBA
Rating Scale: 10 is the most desirable, 5 is the least desirable, 6 to 9 is better than desirable, and 2 to 4 is poorer than desirable.

Table 2 shows that Formulation 4 gives optimal properties in blending ability, tear strength and stiffness.

While this invention has been described in detail for the purpose of illustration, it is not to be construed as limited thereby but is intended to cover all changes and modifications within the spirit and scope thereof.

What is claimed is:

1. A plastic foam composition consisting essentially of:
   a) from about 65 wt % to about 90 wt % of poly-1-butene having a melt flow of from about 0.1 to about 1500 g/10 min;
   b) from about 5 wt % to about 35 wt % of a styrene-conjugated diene block or star copolymer;
   c) from about 5 wt % to about 30 wt % of olefinic rubber made of two or more olefins and/or conjugated dienes having less than 80% of ethylene,
   d) from about 0 wt % to about 15 wt % of a non-elastomeric polyolefin except poly-1-butene;
   e) a sufficient amount of at least one foaming agent; and
   f) optionally from about 0.1 wt % to about 5 wt % of an additive.

2. A plastic foam composition consisting essentially of:
   a) from about 65 wt % to about 90 wt % of poly-1-butene having a melt flow of from about 0.1 to about 1500 g/10 min;
   b) from about 5 wt % to about 35 wt % of a styrene-conjugated diene block or star copolymer;
   c) from about 5 wt % to about 30 wt % of olefinic rubber made of two or more olefins and/or conjugated dienes having less than 80% of ethylene;
   d) a sufficient amount of at least one foaming agent, and
   e) optionally from about 0.1 wt % to about 5 wt % of an additive.

3. The plastic foam as in claim 2, wherein said olefinic rubber is an ethylene-propylene rubber having less than 80 wt % of ethylene.

4. The plastic foam as in claim 3, wherein the weight ratio of ethylene and propylene of said ethylene-propylene rubber is from about 70:30 to about 50:50.

5. The plastic foam as in claim 2, wherein said olefinic rubber is ethylene-propylene butadiene terpolymer.

6. The plastic foam as in claim 2, wherein said styrenic block copolymer is a styrene-ethylene-butylene-styrene (SEBS) bock copolymer.

7. The plastic foam as in claim 1 wherein said foaming agent is selected from the group consisting of fluorinated aliphatic hydrocarbons, aliphatic hydrocarbons, or chemical foaming agents.

8. A plastic foam composition consisting essentially of:
   a) from about 65 wt % to about 90 wt % of poly-1butene having a melt flow of from about 0.1 to about 1500 g/10 min;
   b) from about 5 wt % to about 35 wt % of a styrene-conjugated diene block or star copolymer;
   c) from about 5 wt % to about 30 wt % of olefinic rubber made of two or more olefins and/or conjugated dienes having less than 80% of ethylene;
   d) from about 2 wt % to about 15 wt % of a non-elastomeric polyolefin except poly-1-butene;
   e) a sufficient amount of at least one foaming agent; and
   f) optionally from about 0.1 wt % to about 5 wt % of an additive.

9. The plastic foam composition as in claim 8, wherein said composition consists essentially of:
   a) from about 70 wt % to about 80 wt % of poly-1-butene having a melt flow of from about 0.1 to about 1500 g/10 min;
   b) from about 10 wt % to about 25 wt % of a styrenic block or star copolymer;
   c) from about 7 wt % to about 12 wt % of olefinic rubber having less than 80% of ethylene;
   d) from about 2 wt % to about 15 wt % of a polyethylene;
   e) a sufficient amount of at least one foaming agent; and
   f) optionally from about 0.1 wt % to about 5 wt % of an additive.

10. The plastic foam composition as in claim 9, wherein the polyethylene is a polyethylene homopolymer.

11. The plastic foam composition as in claim 10, wherein the polyethylene is a low density polyethylene homopolymer.

12. The plastic foam as in claim 10, wherein said styrenic block copolymer is a styrene-ethylene-butylene-styrene (SEBS) block copolymer.

13. The plastic foam as in claim 10 wherein said olefinic rubber is an ethylene-propylene butadiene terpolymer.

14. The plastic foam as in claim 10, wherein said olefinic rubber is ethylene-propylene rubber.

15. A plastic foam composition having excellent bending ability, tear strength and stiffness, and temperature resistance properties, which composition consists essentially of:

a) from about 70 wt % to about 80 wt % of poly-1-butene having a melt flow of from about 0.1 to about 1500 g/10 min;

b) from about 15 wt % to about 20 wt % of styrene-ethylene-butylene-styrene block copolymer (SEBS);

c) from about 7 wt % to about 12 wt % of ethylene-propylene rubber having from about 50 wt % to about 70 wt % of ethylene or ethylene-propylene-butadiene terpolymer rubber having less than 80 wt % of ethylene;

d) a sufficient amount of at least one foaming agent selected from the group consisting of fluorinated aliphatic hydrocarbons, aliphatic hydrocarbons, or chemical foaming agents; and optionally e) from about 0.1 wt % to about 5 wt % of an additive.

* * * * *